United States Defensive Publication [19] (H) [11] T962,011
Muehlner [43] Sept. 6, 1977

[54] COEXTRUDED LAMINATE

[75] Inventor: Roland O. Muehlner, Houston, Tex.

[73] Assignee: Shell Oil Company

[21] Appl. No.: 790,529

[22] Filed: Apr. 25, 1977

[51] Int. Cl.² ..... B32B 27/08
[52] U.S. Cl. ..... 428/517; 428/520

[57] ABSTRACT

A laminate having improved adhesion between sheets comprises at least one sheet of a first sheet composed of a high monoalkenyl arene content polymer and at least one sheet of a second sheet composed of block copolymers of monoalkenyl arenes and conjugated dienes, said block copolymer containing about 0.1 to about 10 percent by weight of a fatty acid amide, said first and second sheets being formed by coextrusion. In a preferred embodiment, the high monoalkenyl arene content polymer is polystyrene, the block copolymer is a styrene-butadiene copolymer, and the fatty acid amide is ethylene bis stearylamide.

6 Claims, No Sheets Drawing,

7 Pages Specification

The file of this unexamined application may be inspected and copies thereof may be purchased (849 O.G. 1221, Apr. 9, 1968).